United States Patent Office 2,913,660
Patented Nov. 17, 1959

2,913,660

VISUAL INDICATING APPARATUS

Charles Clark, Jr., Baltimore, Md., assignor, by mesne assignments, to the United States of America as represented by the Secretary of the Air Force Application November 14, 1957, Serial No. 696,577

2 Claims. (Cl. 324—68)

This invention relates to measuring and indicating apparatus and more particularly to method and means for selectively utilizing measuring and indicating apparatus for the purpose of comparing two different portions of a preselected period.

The invention finds important utility as a method of monitoring and evaluating the operations of searching and tracking systems, as for example, systems of the MTI category. In such systems, the range of coverage is preselected. There exists limitations as to the precision of measurements in such systems because of jitter present therein.

This jitter is caused by the phase locked oscillator which is part of the MTI system. The jitter of the oscillator can result from two causes. One is improper phase locking of the oscillator under observation and the other is frequency drift of the oscillator due to hum modulation of the oscillator tube, excessive plate voltage ripple, a bad by-pass condenser in the oscillator tube circuit, or oscillator tuning elements changing values due to temperature change or aging.

It is highly desirable that an operator of an MTI system be able to measure and have visibly indicated the amount of jitter existing in the oscillator circuit; in addition thereto the operator would be able to more efficiently utilize an MTI system when it is possible to have a visual indication of the relative amount and cause of jitter by either improper locking or excessive frequency drift of the MTI oscillator.

In my co-pending application entitled, Phase Controlled Measuring System, filed on even date herewith, I have shown a system for measuring jitter present in a phase locked oscillator. A 6BN6 beam gated tube is utilized as a phase detector; thus, any difference in phase of two signals fed into said tube will be detected. This difference in phase represents jitter present in a phase locked oscillator which is part of an MTI system. Where no difference in phase exists, current through the 6BN6 tube will be at some fixed amplitude. Where the jitter is caused by improper phase locking the current will decrease; if the jitter is as a result of frequency drift in the oscillator, the current will increase. In either case, there will be a variation of current from a fixed level wherever jitter is present. However, since there exists in an MTI system a preselected range, it is possible to compare two portions of the MTI range to one another to provide a means for indicating whether the jitter is caused by improper phase locking or whether it is caused by frequency drift of the phase locked MTI oscillator.

It is an object of the present invention to provide apparatus to measure and indicate the jitter present in an MTI system.

It is a further object of this invention to provide apparatus which will compare two different portions of a preselected MTI range to one another.

It is a still further object of this invention to provide apparatus to visually indicate the relative amount and cause of jitter in a phase locked oscillator.

A more complete understanding of the operation of the present invention, as well as other objects and advantages thereof, will be gleaned from a perusal of the following specification especially when taken in connection with the accompanying drawings which illustrates one method of utilizing the invention which has proven itself in actual application to MTI operations.

Figure 1:
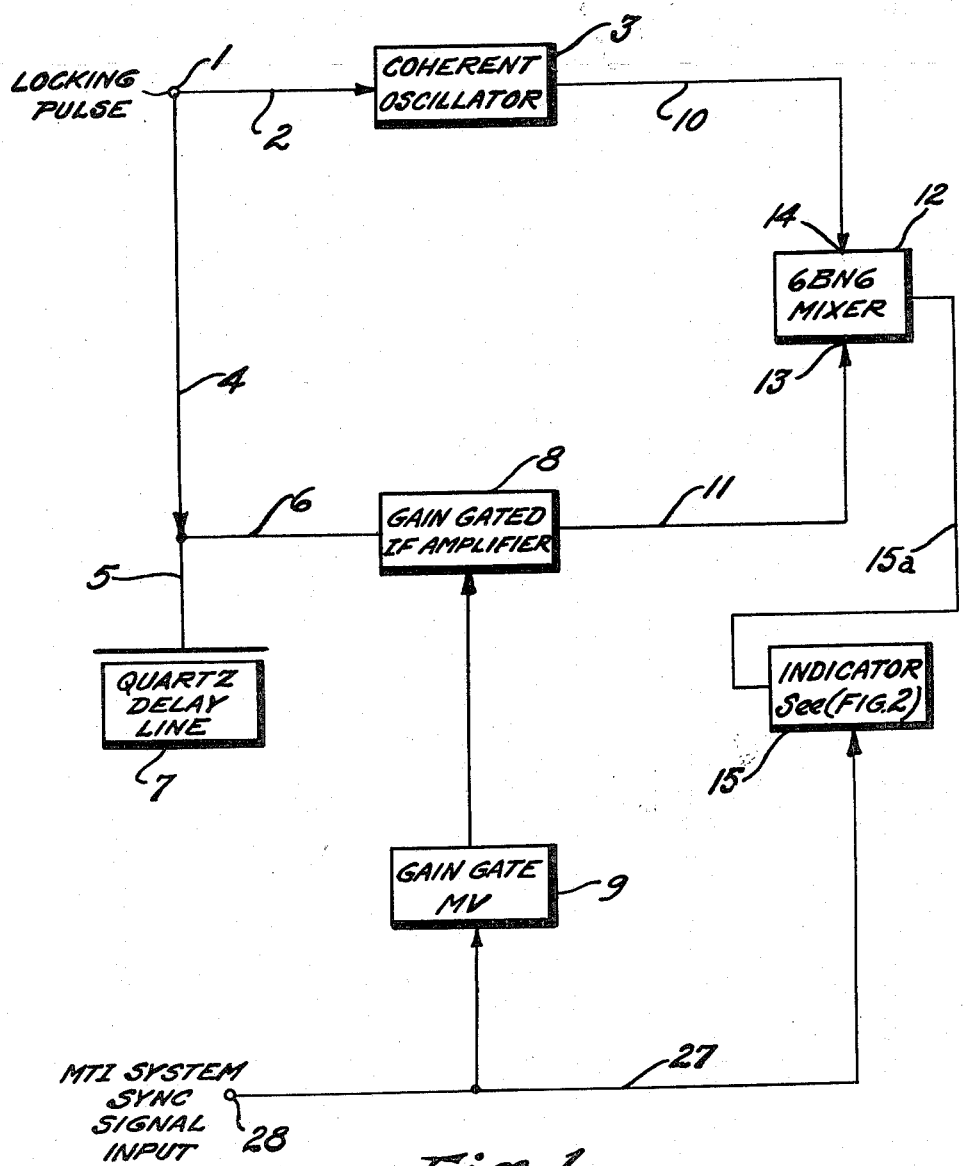
Fig. 1 shows a system for visually indicating jitter in a system such as MTI.

Referring to Fig. 1, there is indicated a signal measuring line 15a constituting the output of 6BN6 mixer 12 whose control inputs 13 and 14, respectively, receive the signals derived from locking pulses injected at input terminal 1 by way of line 2 to coherent oscillator 3 and by way of lines 4 and 5 to quartz delay line 7. The coherent oscillator 3 is phase locked by said locking pulse and thereby controls the oscillator. Quartz delay line 7 generates a series of pulses when locking pulses are fed into it and the pulses are then fed into gain gated IF amplifier 8 by way of lines 5 and 6. The amplitudes of the pulses are normally of different amplitudes so as to overcome the different amplitude levels that are generated from the locking pulse being applied to the reflecting quartz delay line 7, IF amplifier 8 is gated by synchronized multivibrator 9 so that all the pulses on line 11 at output of amplifier 8 have the same amplitude. The synchronizing pulses for multivibrator 9 are supplied from terminal 23 which in turn receives it from the MTI system.

The amplified pulse output from amplifier 8 and the cw. signal from coherent oscillator 3 is fed into 6BN6 mixer 12.

The output from 6BN6 mixer 12 described in my co-pending application entitled, Phase Controlled Measuring System, filed on even date herewith, has a fixed current amplitude when both input signals to 6BN6 mixer are in phase. When jitter is present in oscillator 3 because of improper phase locking or frequency drift, the output from 6BN6 mixer 12 will vary from its fixed amplitude.

The output from 6BN6 mixer 12 is fed to indicator 15 by way of line 15a. The circuitry for indicator 15 is shown in Fig. 2.

Figure 2:
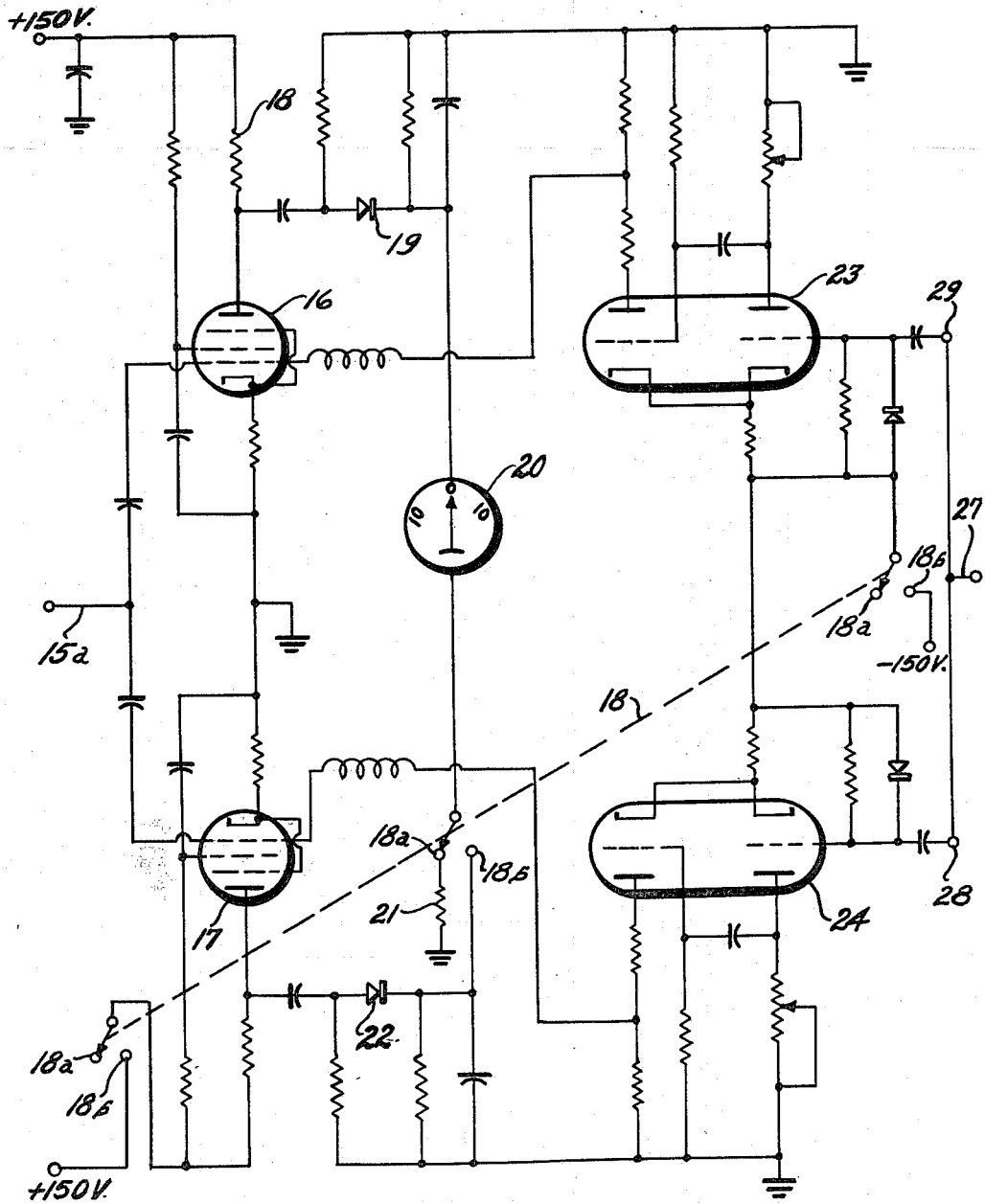
Fig. 2 shows a schematic diagram of the circuitry of the invention.

Referring to Fig. 2, the selective utilization of my present invention is comprised of switching mechanism, measuring and indicating meter, and two gain gated video amplifiers and their associated gain gate multivibrators. The gain gated video amplifiers include unipolar detectors.

The above-referred to gain gated video amplifier is comprised of a pair of amplifiers whose pentode components 16 and 17, respectively, have their control grids actuated by the signal output from 6BN6 mixer (as shown in Fig. 1) by way of line 15a.

In normal operation, switching mechanism 18 is in position 18a. The output of the gain gated amplifier, which includes tube 16, is connected to D.C. microammeter 20 by way of unipolar detector 19 and meter 20 is connected to ground by way of switch 18 and resistor 21. The normal meter indication is approximately 75 ua. on 100 ua. meter 20 when there is a signal present. This indication represents normal coherent signals; that is, there is no jitter present in the coherent oscillator. The utilization of video amplifiers allows a much smaller differential of voltage to be indicated because the total voltage applied to meter 20 is signal voltage.

When there is a deviation from the normal meter reading (in this instance 75 ua.), then the signal on line 15a is being varied. This indicates that the two signals entering 6BN6 mixer 12 (Fig. 1) are out of phase, this may be attributable to either improper phase locking or frequency drift in the coherent oscillator. The operator then visually is presented with information to the effect that jitter exists in the coherent oscillator.

When the operator of the MTI system obtains an indication that jitter is present in the coherent oscillator, it is desirable to determine the cause. The operator then actuates switch 18 from its normal position 18a to 18b. This energizes gain gated amplifier which includes pentode 17 by providing +150 volts to pentode 17; it also energizes a pair of gain gate multivibrators by supplying −150 volts thereto; and in addition meter 20 is connected between two unipolar detectors 19 and 22. Gain gate multivibrator, including twin triode 23, is associated with the amplifier containing pentode 16. Gain gate multivibrator including twin triode 24 is associated with the amplifier containing pentode 17.

The gain gate multivibrators receive synchronizing signals from the MTI system by way of common line 27 to input terminals 28 and 29, respectively. The gain gated amplifiers are gated on and off to allow a comparison of two different periods within the MTI range to determine the cause of jitter. Gain gate amplifier containing pentode 16 is gated on by a pulse from multivibrator which includes twin triode 23, for two hundred (200) microseconds. This pulse is fed from the anode circuit of twin triode 23 to the control grid of pentode 16. Simultaneously gain gated amplifier containing pentode 17 is cut off for four hundred (400) microseconds by the action of multivibrator which includes twin triode 24. This is accomplished by a pulse from the anode circuit of twin triode 24 being impressed upon the control grid of pentode 17. The time is set such that one gain gated amplifier is on for the first third part of the MTI range of the six hundred (600) microseconds and the other gain gated amplifier is cut off only for the first two thirds of the MTI range. The signal from the anode circuit of pentode 16 is fed to unipolar detector 19 and the signal from pentode 17 is fed to unipolar detector 22. Meter 20 is connected between the outputs of unipolar detectors 19 and 22. This arrangement allows one gain gated amplifier to measure the jitter of the first third of the MTI range and the other gain gated amplified to measure the jitter of the last third of the MTI range. The signals from each of the gain gate amplifiers represent the amount of jitter per time gated.

Figure 3:
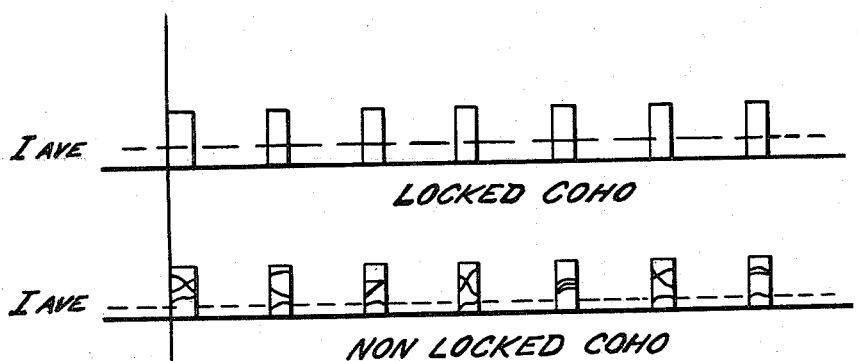
Figs. 3 and 4 show variations in current in the visual indicating apparatus with variations in signal.
Figure 4:
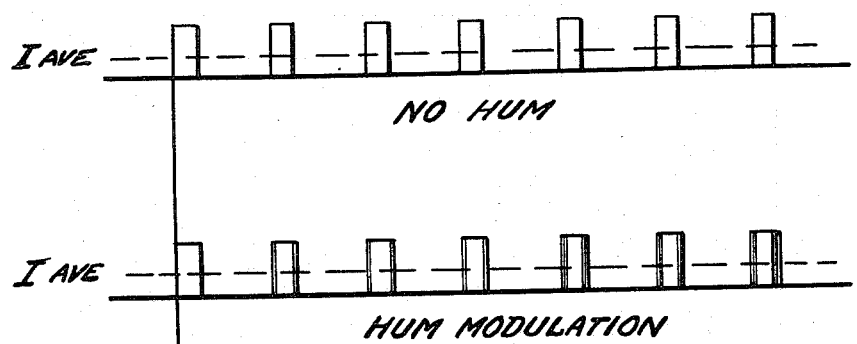

Meter 20 indication will change as follows as the signals from unipolar detectors 19 and 22 are applied thereto: As the coherent oscillator becomes unlocked, meter 20 indication decreases as shown in Fig. 3, and as the jitter due to hum modulation increases, meter 20 indication will increase as shown in Fig. 4. When the two portions of the MTI range are compared to one another, the multivibrators are actuated and the differences in the output signals of the two circuit channels (the pair of gain gated amplifiers and associated unipolar detectors) are compared directly; thus giving the operator a closer look as to the cause and relative amount of jitter. Equal channel output signals indicate that the jitter is caused by non-locking of the coherent oscillator. A difference in the output voltages of the said two channels indicate hum modulation (frequency drift). By previous calibration of meter 20, the operator can see how bad the hum modulation is.

With complete unlocking of the coherent oscillator, the normal 75 ua. indication drops to approximately one-half of the normal indication. The increase due to hum modulation is very slight, but a comparison between the first and last portions of the MTI range shows a distinct difference.

What is claimed is:

1. In a system including a pair of signal generators adapted to receive actuating energy in the form of common electrical pulses having a preselected repetition rate, and having a dual-input phase detector adapted to receive the respective outputs of said signal generators, the combination of such phase detection of a pair of video amplifiers connected to receive the output of said phase detector, each of said video amplifiers including a rectifier in its output circuit, switching means bridging both input and output circuits of said pair of video amplifiers, said switching means operable in two positions, visual output indicating means connected in one position of said switching means to indicate any variation in output from one of said video amplifiers and its associated rectifier, said indicating means being effective in the other position of said switching means to indicate the output of said pair of video amplifiers and their associated rectifiers, and means to apply gating pulses to each of said video amplifiers to obtain periodic samplings of a pattern established by said preselected repetition rate of said electrical pulses, said gating means being operative in said other position of said switching means.

2. A system as defined in claim 1 wherein said gating means is comprised of a pair of multivibrators.

References Cited in the file of this patent

UNITED STATES PATENTS

| | | |
|---|---|---|
| 2,530,035 | Watt | Nov. 14, 1950 |
| 2,706,265 | Buehler | Apr. 12, 1955 |
| 2,750,563 | Winter | June 12, 1956 |
| 2,802,105 | Odden | Aug. 6, 1957 |